(No Model.)
J. W. VAUGHN.
RUNNING GEAR FOR VEHICLES.
No. 313,392. Patented Mar. 3, 1885.
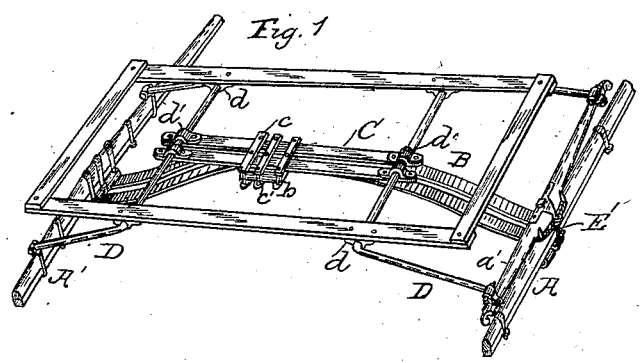
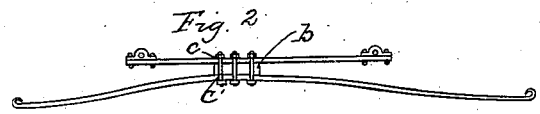
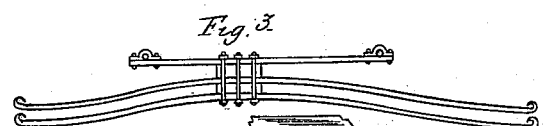
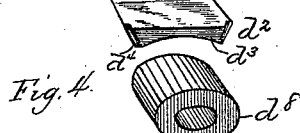
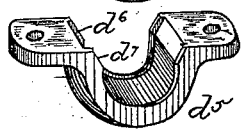
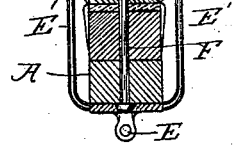
Witnesses:
Geo. H. Evans
Chas. R. Wright
Inventor:
James Wilbur Vaughn
per Lenox Simpson & Co.

UNITED STATES PATENT OFFICE.

JAMES WILBUR VAUGHN, OF GREENVILLE, PENNSYLVANIA.

RUNNING-GEAR FOR VEHICLES.

SPECIFICATION forming part of Letters Patent No. 313,392, dated March 3, 1885.

Application filed November 11, 1884. (No model.)

To all whom it may concern:

Be it known that I, JAMES WILBUR VAUGHN, a citizen of the United States, residing at Greenville, in the county of Mercer and State of Pennsylvania, have invented certain new and useful Improvements in Vehicle Running-Gear, of which the following is a full, clear, and exact description.

My invention relates to that class of vehicle running-gear in which central longitudinal springs are employed.

The object of the invention is, first, to deaden the ordinary vibration of the vehicle-body; second, to distribute the weight of the vehicle's contents equally upon the various parts of the running-gear, as hereinafter described; third, to distribute the strain so that it may not fall wholly and at all times upon the spring connecting the axles; fourth, to provide means whereby the bearing-surface upon the main spring may be shifted to suit the position of the load which the vehicle is constructed to carry; fifth, to allow for a slight vertical displacement of the top plate of the fifth-wheel.

The invention consists in the hereinafter-described means for attaining said object.

In the drawings, Figure 1 represents a perspective view of my improved running-gear; Figs. 2 and 3, modifications of the spring; Fig. 4, a detail view of the parts of the bearing-blocks; Fig. 5, a detail view of the fifth-wheel guard and king-bolt.

A A' are the front and rear axles of a light wagon, to which is secured the longitudinal central spring, B. In light vehicles this spring is constructed as shown in Fig. 2, while in heavy vehicles (as in two-seated carriages) the spring may be duplicated, as in Figs. 1 and 3. In case the duplicate spring is used, the two parts are so secured together as to form, in effect, a single spring. Upon the arch of the spring is superposed a block, $b$.

C is a supplemental spring, which may be straight or curved, and is secured upon the top of block $b$ by means of transverse plates or straps $c$ and bolts $c'$. The under plates, $c$, pass beneath the spring B, and the bolts $c'$ are secured upon either side of the springs B and C. By this construction it will be apparent that by loosening the bolts the block may be shifted forward or backward between the springs B and C, and the bearing-points of said springs thus brought in proper relative position to the weight carried.

Hinged to bolster $a'$ and to the rear axle, A', are two bails or crank-rods, D. Said bails are secured to the vehicle-body by boxes $d$, and to the spring C by the boxes $d'$. Said boxes $d$ $d'$ are similarly constructed, and are composed of a plate, $d^2$, provided with upright side flanges, $d^3$, having inwardly-curved extremities, $d^4$, and a cap, $d^5$, having its middle portion arched and provided with downwardly-extending flanges $d^6$. Said flange $d^6$ has its ends diagonally reduced at $d^7$. The plate $d^2$ fits within and beneath the cap $d^5$, and in the space contained between the top of the cap, the plate, and the flanges fits an annular rubber washer, $d^8$. The openings in the boxes $d$ $d'$ are oblong, and through these openings and the annular washers pass the bails D. The result of this construction is to allow a "play" of about a quarter of an inch in each box, this play being restricted only by the elastic pressure of the rubber washers. The play thus allowed between the vehicle-body, the bails, and the spring G is sufficient to deaden the ordinary vibration of the vehicle. The springs B and C act to a certain extent in opposition to each other, and, when combined with the bails, serve to distribute the strain to the two axles and front bolster. Furthermore, by the use of the short spring C, the spring B is relieved of a portion of the load, and said spring B may be made proportionately lighter therefor. The forward end of the spring B is secured to an eye, E, constructed integral with two upwardly-extending arms, E'. Said arms extend upwardly in front and rear of the axle A and bolster $a'$, and pass through orifices formed in the ears of clips E². Spiral springs E³ surround the arms E' above the ears of the clips, and nuts E⁴ secure the clips, springs, and arms together. The head of the king-bolt F is countersunk in the bottom of the shackle, and extends upwardly through the axle, fifth-wheel, bolster, and clip. The upper extremity of the bolt is surrounded by a coil-spring, $f$, and held in place by a nut, $f'$.

By the aforegoing construction the upper plate of the fifth-wheel and the bolster are allowed a vertical play of about one-fourth of an inch, said play allowing either of the front wheels to run in a hole or over an uneven surface without giving to the vehicle-body the lateral jerk experienced with vehicles of the ordinary construction.

I am aware that it is not broadly new to use a single central longitudinal spring connecting the two axles of a vehicle, and that the use of bails to distribute the weight is old. These devices, therefore, I do not broadly claim; but,

Having thus described my invention, what I claim is—

1. The spring C, having boxes $d'$, in combination with the bails and body having boxes $d$, whereby said spring and body may be connected, as described.

2. In vehicle running-gear, the combination of springs B C and bails D, as and for the purposes set forth.

3. A bearing which consists of the plate $d^2$, flanged at $d^3$, and having extremities $d^4$, the cap $d^5$, flanged at $d^6$ $d^7$, and a tubular rubber, as shown and described.

4. The combination, with bolster, front axle, king-bolt, and spring B, of eye E, having the two arms E′, the clips $E^2$, having orificed ears, the spiral springs $E^3$ $f$, and the nuts $E^4$ $f'$, whereby vertical play may be allowed to the bolster, as described.

JAMES WILBUR VAUGHN.

Witnesses:
T. C. GIBSON,
A. S. KREPS.